US011692826B2

(12) United States Patent
Taji et al.

(10) Patent No.: US 11,692,826 B2
(45) Date of Patent: Jul. 4, 2023

(54) ANGULAR VELOCITY SENSOR

(71) Applicant: Panasonic Intellectual Property Management Co., Ltd., Osaka (JP)

(72) Inventors: Shoichi Taji, Osaka (JP); Hiroyuki Aizawa, Osaka (JP); Soichiro Hiraoka, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 116 days.

(21) Appl. No.: 17/599,212

(22) PCT Filed: Mar. 5, 2020

(86) PCT No.: PCT/JP2020/009323
§ 371 (c)(1),
(2) Date: Sep. 28, 2021

(87) PCT Pub. No.: WO2020/203011
PCT Pub. Date: Oct. 8, 2020

(65) Prior Publication Data
US 2022/0178695 A1    Jun. 9, 2022

(30) Foreign Application Priority Data
Mar. 29, 2019  (JP) .................. 2019-068223

(51) Int. Cl.
*G01C 19/5733*   (2012.01)
*G01C 19/5769*   (2012.01)

(52) U.S. Cl.
CPC ..... *G01C 19/5733* (2013.01); *G01C 19/5769* (2013.01)

(58) Field of Classification Search
CPC .................. G01C 19/5769; G01C 19/5733
See application file for complete search history.

(56) References Cited

U.S. PATENT DOCUMENTS 6,845,669 B2 *  1/2005  Acar ............... B81B 3/0062
                                                73/504.12
8,322,213 B2 * 12/2012  Trusov ............ G01C 19/5747
                                                73/504.12
(Continued)

FOREIGN PATENT DOCUMENTS

WO    2018/193890 A1   10/2018

OTHER PUBLICATIONS

International Search Report and Written Opinion issued in International Patent Application No. PCT/JP2020/009323, dated Jun. 9, 2020; with partial English translation.

*Primary Examiner* — Paul M. West
*Assistant Examiner* — Mark A Shabman
(74) *Attorney, Agent, or Firm* — McDermott Will & Emery LLP

(57) ABSTRACT

An anchor member supports a frame-shaped member. A first input electrode is located outside the frame-shaped member and separate from the frame-shaped member and fixed to a substrate. A second input electrode includes an electrode portion located outside the frame-shaped member and connected to the frame-shaped member. The second input electrode is displaceable in a prescribed direction. A first reference electrode is inside the frame-shaped member and fixed to the substrate. A second reference electrode includes an electrode portion located inside of the frame-shaped member and connected to the frame-shaped member. The second reference electrode is displaceable in the prescribed direction. In the structural component, the first input electrode and the electrode portion of the second input electrode are located between the frame-shaped member and a weight member in the prescribed direction in plan view in a thickness direction defined with respect to the substrate.

11 Claims, 7 Drawing Sheets

(56) References Cited

U.S. PATENT DOCUMENTS

| | | | |
|---|---|---|---|
| 2011/0094302 A1* | 4/2011 | Schofield | G01C 19/56 |
| | | | 73/504.12 |
| 2014/0026662 A1* | 1/2014 | Anac | G01C 19/574 |
| | | | 73/504.12 |
| 2015/0377621 A1* | 12/2015 | Chaumet | G01C 19/5747 |
| | | | 73/504.16 |
| 2018/0283868 A1* | 10/2018 | Kanemoto | G01C 19/5747 |
| 2020/0019819 A1 | 1/2020 | Koushik Bangalore Suryanarayana et al. | |
| 2020/0096337 A1* | 3/2020 | Senkal | G01C 19/5712 |
| 2020/0191819 A1* | 6/2020 | Suzuki | G01P 3/4805 |

* cited by examiner

ANGULAR VELOCITY SENSOR

CROSS-REFERENCE OF RELATED APPLICATIONS

This application is the U.S. National Phase under 35 U.S.C. § 371 of International Patent Application No. PCT/JP2020/009323, filed on Mar. 5, 2020, which in turn claims the benefit of Japanese Application No. 2019-068223, filed on Mar. 29, 2019, the entire disclosures of which Applications are incorporated by reference herein.

TECHNICAL FIELD

The present disclosure relates generally to angular velocity sensors, and specifically, to an angular velocity sensor including a weight member.

BACKGROUND ART

As an angular velocity sensor, a gyroscope produced by a bulk micromachining process to a SOI wafer has been known (Patent Literature 1).

The gyroscope described in Patent Literature 1 includes four structural components (tines 40). The structural components includes a weight member (a proof mass 24), an anchor member (anchor 20), four frame-shaped members (drive-mode shuttles 26, sense mode shuttles 22) surrounding the weight member, a drive portion (a differential lateral comb or parallel plate electrode 34), and a detecting portion (a differential parallel plate electrode 36).

The angular velocity sensor may be desirably improved in sensitivity with its size being reduced.

CITATION LIST

Patent Literature

Patent Literature 1: U.S. Pat. No. 8,322,213 B2

SUMMARY OF INVENTION

An object of the present disclosure is to provide an angular velocity sensor improved in sensitivity with its size being reduced.

An angular velocity sensor according to an aspect of the present disclosure includes a substrate and a structural component. The structural component is provided at a side of a principal surface of the substrate. The structural component includes a weight member, a frame-shaped member, an elastic member, an anchor member, a first input electrode, a second input electrode, a first reference electrode, and a second reference electrode. The frame-shaped member is aligned with the weight member in a prescribed direction orthogonal to a thickness direction defined with respect to the substrate and is displaceable in the prescribed direction. The elastic member connects the weight member to the frame-shaped member and is elastically deformable in a direction orthogonal to the thickness direction defined with respect to the substrate and the prescribed direction. The anchor member supports the frame-shaped member and is fixed to the substrate. The first input electrode is located on an outer side of the frame-shaped member to be separate from the frame-shaped member and is fixed to the substrate. The second input electrode includes an electrode portion located on the outer side of the frame-shaped member and is connected to the frame-shaped member. The second input electrode faces the first input electrode and is displaceable in the prescribed direction. The first reference electrode is located on an inner side of the frame-shaped member and is fixed to the substrate. The second reference electrode includes an electrode portion located on the inner side of the frame-shaped member and is connected to the frame-shaped member. The second reference electrode faces the first reference electrode and is displaceable in the prescribed direction. In the structural component, the first input electrode and the electrode portion of the second input electrode are located between the frame-shaped member and the weight member in the prescribed direction in plan view in the thickness direction defined with respect to the substrate.

An angular velocity sensor according to an aspect of the present disclosure includes a substrate and a structural component. The structural component is provided at a side of a principal surface of the substrate. The structural component includes a weight member, a pair of frame-shaped members, a pair of first elastic members, a pair of anchor members, a pair of first input electrodes, a pair of second input electrodes, a pair of first reference electrodes, and a pair of second reference electrodes. The weight member has an outer peripheral shape which is a polygonal shape in plan view in a thickness direction defined with respect to the substrate. The pair of frame-shaped members are located on one side and the other side of the weight member in a prescribed direction orthogonal to the thickness direction defined with respect to the substrate. The pair of frame-shaped members are displaceable in the prescribed direction. Each of the pair of first elastic members connects the weight member to a corresponding one of the pair of frame-shaped members and is elastically deformable in a direction orthogonal to the thickness direction defined with respect to the substrate and the prescribed direction. Each of the pair of anchor members supports the corresponding one of the pair of frame-shaped members and is fixed to the substrate. The pair of first input electrodes correspond to the pair of frame-shaped members on a one-to-one basis. Each of the pair of first input electrodes is located on an outer side of a corresponding one of the frame-shaped members and is fixed to the substrate. The pair of second input electrodes include electrode portions corresponding to the pair of frame-shaped members on a one-to-one basis. Each of the electrode portions is located on the outer side of the corresponding one of the frame-shaped members and is connected to the corresponding one of the frame-shaped members. Each of the pair of second input electrodes faces a corresponding one of the first input electrodes and is displaceable in the prescribed direction. The pair of first reference electrodes correspond to the pair of frame-shaped members on a one-to-one basis. Each of the pair of first reference electrodes is located on an inner side of a corresponding one of the frame-shaped members and is fixed to the substrate. The pair of second reference electrodes include electrode portions corresponding to the pair of frame-shaped members on a one-to-one basis. Each of the electrode portions is located on the inner side of the corresponding one of the frame-shaped members and is connected to the corresponding one of the frame-shaped members. The pair of second reference electrodes face the pair of first reference electrodes and are displaceable in the prescribed direction. In the structural component, each of the first input electrodes and a corresponding one of the electrode portions of the second input electrodes are located between the weight member and the corresponding one of the pair of frame-shaped members in the prescribed direction in plan view in the thickness direction defined with respect to the substrate.

DESCRIPTION OF EMBODIMENTS

Figure 1:
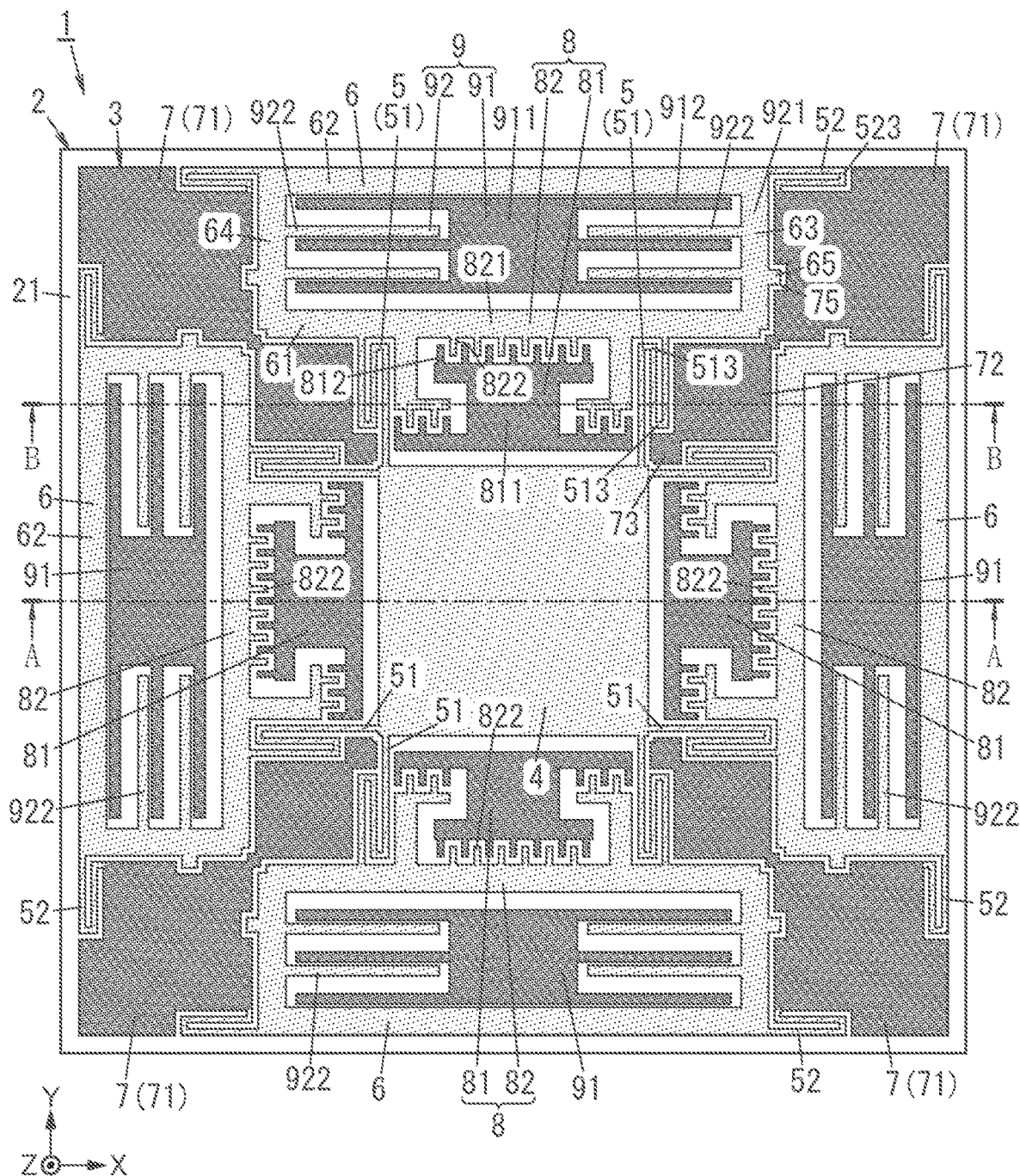
FIG. 1 is a plan view of the angular velocity sensor according to the first embodiment.
Figure 2:
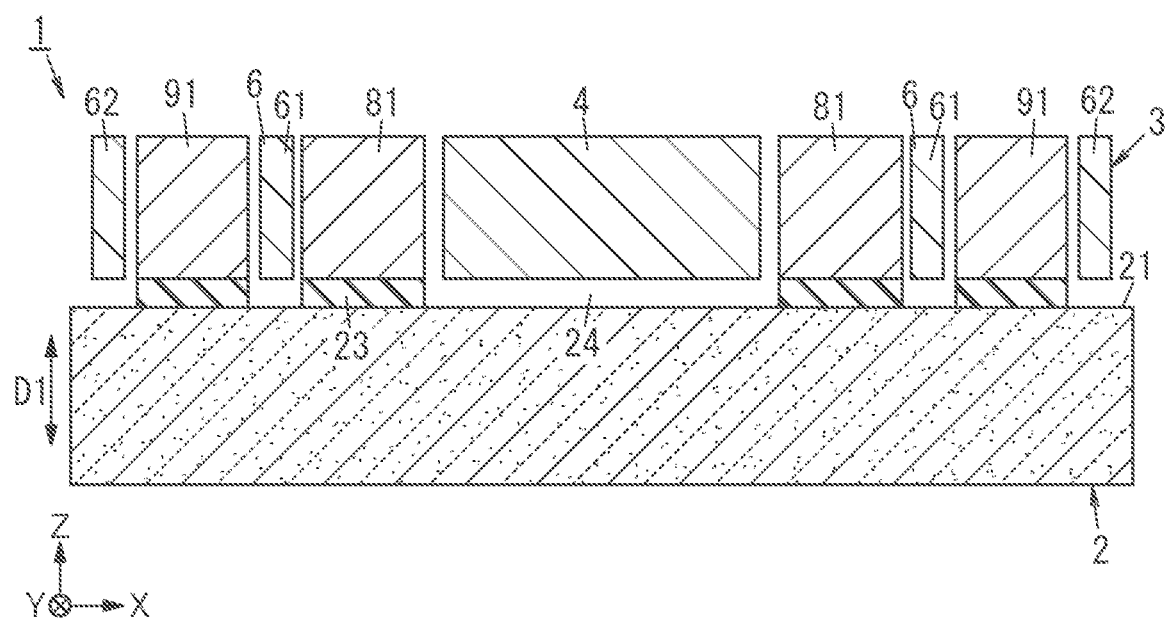
FIG. 2 is a cross-section view of the angular velocity sensor along line A-A of FIG. 1.
Figure 3:
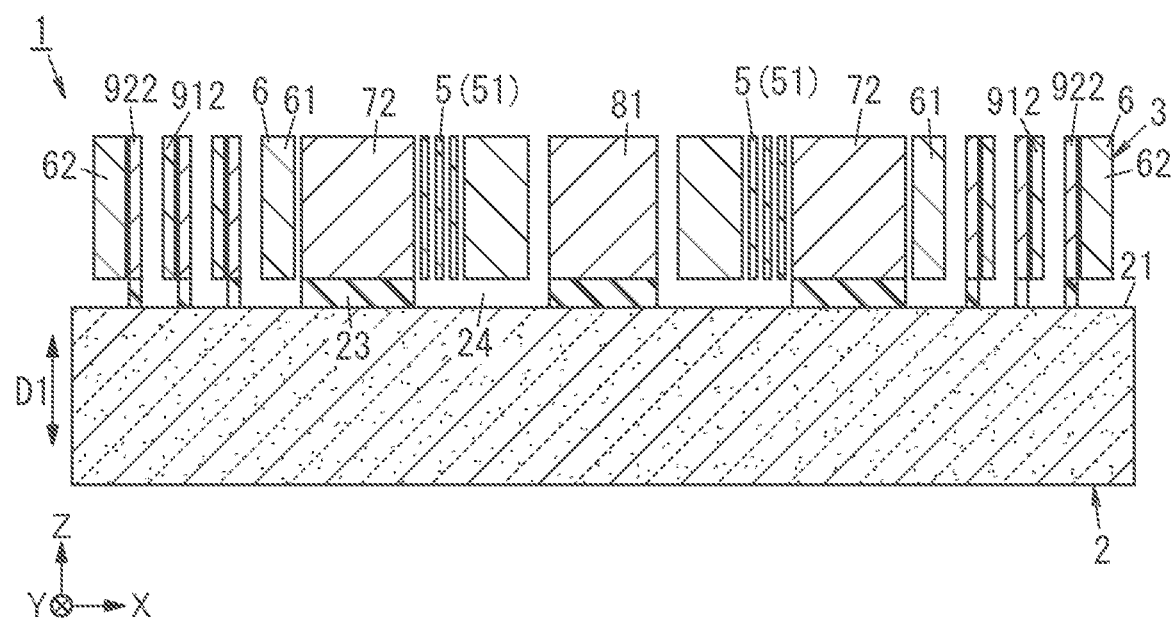
FIG. 3 is a cross-section view of the angular velocity sensor along line B-B of FIG. 1.

Figures described in the following embodiments are schematic views, and the ratio of sizes and the ratio of thicknesses of components in the figures do not necessarily reflect actual dimensional ratios.

First Embodiment

With reference to FIGS. 1 to 4, an angular velocity sensor 1 according to a first embodiment will be described below.

(1) Schema

As shown in FIGS. 1 to 4, the angular velocity sensor 1 according to the first embodiment includes a substrate 2 and a structural component 3. The structural component 3 is provided at the side of a principal surface 21 of the substrate 2. Note that the principal surface 21 of the substrate 2 is one surface of two surfaces of the substrate 2 which are transverse to a thickness direction D1 defined with respect to the substrate 2, and the one surface faces the structural component 3.

The structural component 3 includes a weight member 4, frame-shaped members 6, elastic members 5, anchor members 7, first input electrodes 81, second input electrodes 82, first reference electrodes 91, and second reference electrodes 92.

The angular velocity sensor 1 includes drive portions 8 for driving (vibrating) the weight member 4. Each drive portion 8 includes the first input electrode 81 and the second input electrode 82. Each drive portion 8 is an electrostatic driving-type drive portion configured to drive the weight member 4 by electrostatic force generated between the first input electrode 81 and the second input electrode 82.

The angular velocity sensor 1 includes detecting portions 9 for detecting an angular velocity. Each detecting portion 9 includes the first reference electrode 91 and the second reference electrode 92. In each detecting portion 9, the capacitance of a capacitor including the first reference electrode 91 and the second reference electrode 92 changes depending on the angular velocity.

The angular velocity sensor 1 converts, for example, the angular velocity into an electric signal. That is, the angular velocity sensor 1 functions as a transducer configured to convert the angular velocity into the electric signal. The angular velocity sensor 1 may be used in, for example, a household appliance, a portable terminal, a camera, a wearable terminal, a game console, a vehicle (including an automobile, a two-wheel vehicle, and the like), a robot, a construction machinery, a drone, an aircraft, or a marine vessel.

(2) Details

The configuration of the angular velocity sensor 1 according to the first embodiment will be described in detail with reference to FIGS. 1 to 4.

In the following description, for example, an orthogonal coordinate having three axes, namely, an X-axis, a Y-axis, and a Z-axis orthogonal to one another is specified, where, in particular, an axis along a thickness direction D1 defined with respect to the substrate 2 (and a thickness direction defined with respect to the weight member 4) is defined as the "Z-axis", and an axis along a vibration (drive) direction of the weight member 4 is defined as the "X-axis". The "Y-axis" is orthogonal to both the Z-axis and the X-axis. The axis along the vibration (drive) direction of the weight member 4 is not limited to the X-axis but may be the Y-axis. The X-axis, the Y-axis, and the Z-axis are virtual axes, and arrows indicating "X", "Y", and "Z" in the drawings are shown merely for the sake of description and are not accompanied with entity. Note that these directions should not be construed as limiting the directions in which the angular velocity sensor 1 is used. Note that the origin of the orthogonal coordinate can be defined, for example, at the center of the structural component 3 (in the example shown in FIG. 1, the center of the weight member 4) in plan view in the thickness direction D1 defined with respect to the substrate 2.

For the angular velocity sensor 1 according to the first embodiment, a sensing target is, for example, an angular velocity around the Z-axis. The Z-axis is an axis along the thickness direction D1 defined with respect to the substrate 2 and the thickness direction defined with respect to the weight member 4, and consequently, the angular velocity sensor 1 detects, as the sensing target, an angular velocity acting on the angular velocity sensor 1 as a result of rotation of the angular velocity sensor 1 around the central axis of the weight member 4. That is, the angular velocity sensor 1 outputs an electric signal according to the angular velocity around the central axis of the weight member 4. Thus, based on the output from the angular velocity sensor 1, the magnitude of the angular velocity around the central axis of the weight member 4 (around the Z-axis) can be measured.

(2.1) Overall Configuration of Angular Velocity Sensor

As described above, the angular velocity sensor 1 according to the first embodiment includes a substrate 2 and a structural component 3. The structural component 3 is provided at the side of a principal surface 21 of the substrate 2.

As described above, the structural component 3 includes the weight member 4, the frame-shaped members 6, the elastic members 5 (hereinafter also referred to as first elastic members 51), the anchor members 7 (hereinafter also referred to as first anchor members 71), the first input electrodes 81, the second input electrodes 82, the first reference electrodes 91, and the second reference electrodes 92. Moreover, the structural component 3 further includes second elastic members 52. Further, the structural component 3 further includes second anchor members 72. Furthermore, the structural component 3 further includes third anchor members 73.

Figure 4:
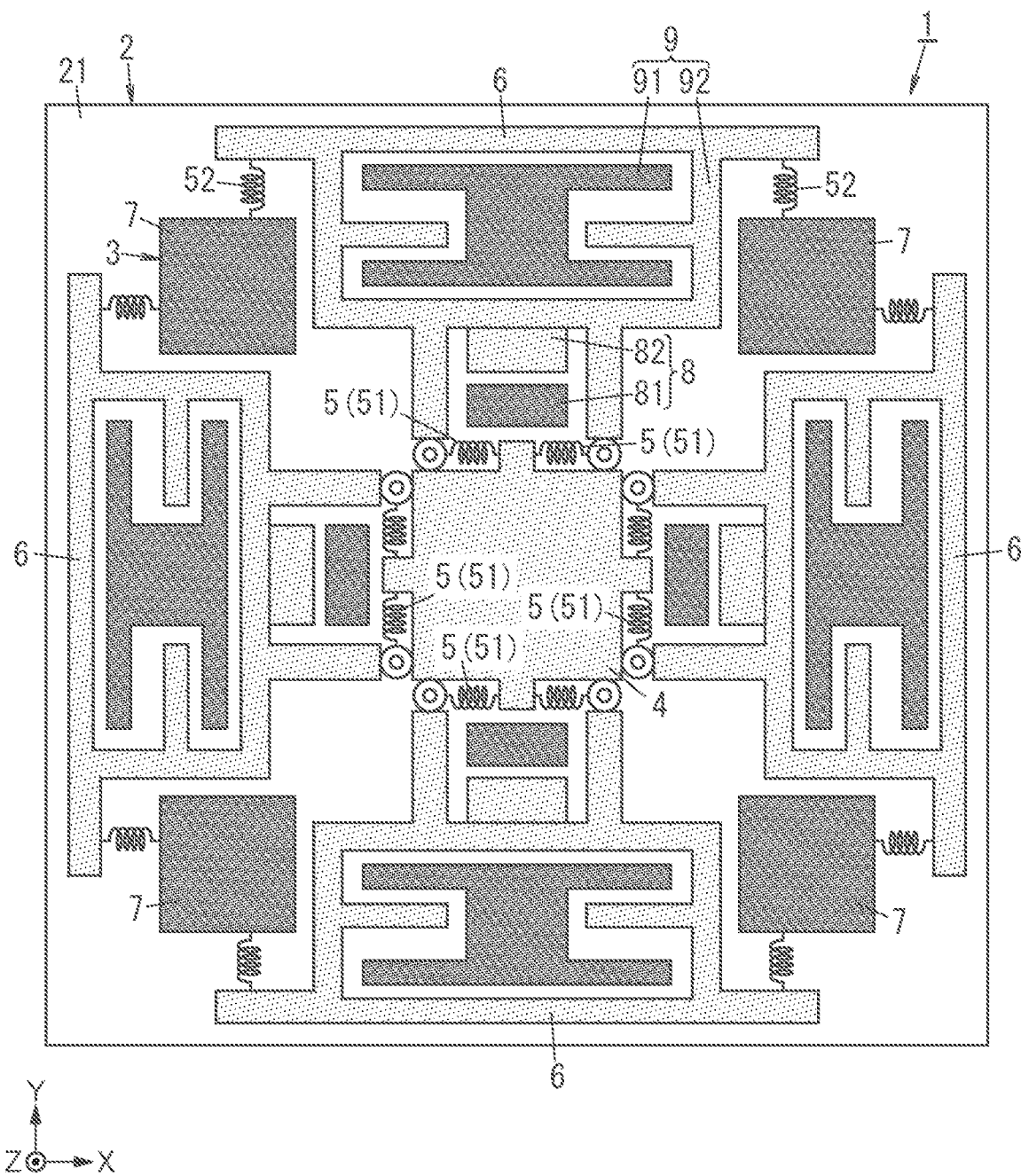
FIG. 4 is a view of the angular velocity sensor, wherein the plan view corresponding to FIG. 1 is shown in a further schematized manner.

FIG. 4 is a schematic diagram schematically showing the configuration of the angular velocity sensor 1. In FIG. 4, the shape and the like of each component may be different from the actual shape and the like. For example, in FIG. 4, the first elastic members 51 and the second elastic members 52 are schematically represented by "spring" symbols which do not represent the actual shape of the first elastic members 51 and the second elastic members 52. Note that a direction in which one end and the other end of each "spring" symbol are aligned corresponds to a direction in which elastic deformation easily occurs. For example, the first elastic members 51 at an upper side of the weight member 4 in FIG. 4 easily elastically deform in the X-axis direction, and the second elastic members 52 connected to the frame-shaped member 6 at the top in FIG. 4 easily elastically deform in the Y-axis direction.

The sensing target of the angular velocity sensor 1 according to the first embodiment is an angular velocity around the Z-axis (around the central axis of the weight member 4). Thus, the angular velocity sensor 1 outputs an electric signal according to the angular velocity around the Z-axis. The angular velocity sensor 1 is a vibrating structure gyroscope sensor and senses the angular velocity around the Z-axis by using Coriolis force (deflecting force). That is, the angular velocity sensor 1 causes the weight member 4 to vibrate, and in this state, the angular velocity sensor 1 senses Coriolis force generated by rotational force externally acting on the weight member 4, thereby sensing the angular velocity acting on the weight member 4 of the angular velocity sensor 1. For example, the angular velocity sensor 1 according to the first embodiment can detect an angular velocity by each detecting portion 9 (the first reference electrode 91 and the second reference electrode 92) in the Y-axis direction when the angular velocity around the Z-axis is input while the weight member 4 vibrates in the X-axis direction by electrostatic force generated at each drive portion 8 (the first input electrode 81 and the second input electrode 82).

In the angular velocity sensor 1 according to the first embodiment, the weight member 4 has an outer peripheral shape which is a polygonal shape (e.g., a substantially square shape) in plan view in the thickness direction D1 defined with respect to the substrate 2. The structural component 3 includes a plurality of (four) sets each including two elastic members 5, a frame-shaped member 6, a first input electrode 81, a second input electrode 82, a first reference electrode 91, and a second reference electrode 92. The plurality of sets are arranged such that the second input electrodes 82 face sides of the polygonal shape on a one-to-one basis on an outer side of the weight member 4. The plurality of sets are preferably arranged to have rotation symmetry with the central axis of the weight member 4 along the thickness direction D1 defined with respect to the substrate 2 as an axis of rotation. In the angular velocity sensor 1 according to the first embodiment, each of the plurality of sets includes two second elastic members 52. Note that the substrate 2 has an outer peripheral shape which is a square shape in plan view in the thickness direction D1 defined with respect to the substrate 2, but the outer peripheral shape of the substrate 2 is not limited to this example. The outer peripheral shape of the substrate 2 may be, for example, a rectangular shape.

In the angular velocity sensor 1 according to the first embodiment, the structural component 3 has a plurality of (in this embodiment, four) frame-shaped members 6. The four frame-shaped members 6 are arranged to surround one weight member 4 in plan view in the thickness direction D1 defined with respect to the substrate 2. Specifically, the frame-shaped members 6 are located one by one on both sides in the Y-axis direction and both sides in the X-axis direction of the weight member 4. The weight member 4 is separate from each frame-shaped member 6.

Each frame-shaped member 6 is aligned with the weight member 4 in a prescribed direction orthogonal to the thickness direction D1 defined with respect to the substrate 2 and is displaceable in the prescribed direction. In the angular velocity sensor 1 according to the first embodiment, the structural component 3 includes the plurality of frame-shaped members 6 as described above, and for each of the plurality of frame-shaped members 6, the prescribed direction in which the weight member 4 aligns is prescribed, and therefore, the prescribed direction is hereinafter also referred to as a prescribed direction corresponding to the frame-shaped member 6. That is, the prescribed direction corresponding to the frame-shaped member 6 of the frame-shaped member 6 at an upper part in FIG. 1 is different from that of the frame-shaped member 6 at the left in FIG. 1.

Each of the four frame-shaped members 6 has a rectangular frame shape and includes four frame pieces 61 to 64. Of the four frame pieces 61 to 64, the two frame pieces 61 and 62 each have a length direction orthogonal to the prescribed direction in which the frame-shaped member 6 aligns with the weight member 4, and the length of each of the two frame pieces 61 and 62 is longer than the length of each of the two frame pieces 63 and 64 each having a length direction corresponding to the prescribed direction. That is, each of the four frame-shaped members 6 has a length longer in the direction orthogonal to the prescribed direction than in the prescribed direction. Moreover, in each of the four frame-shaped members 6, the length in the length direction of the frame piece 61 is longer than the length of a side of the weight member 4 facing the frame-shaped member 6 (one side of the weight member 4 having a square shape).

In the angular velocity sensor 1, the weight member 4 and each of the four frame-shaped members 6 are connected to each other via a pair of first elastic members 51. The pair of first elastic members 51 have respective one ends connected to a pair of corners of the weight member 4 and the other ends connected to the frame piece 61, which is closest to the weight member 4, of the four frame pieces 61 to 64 of the frame-shaped member 6.

The first elastic members 51 connect the weight member 4 to the frame-shaped members 6 and are elastically deformable in a direction orthogonal the thickness direction D1 defined with respect to the substrate 2 and a direction orthogonal to the prescribed directions corresponding to the frame-shaped members 6. For example, the first elastic members 51 connected to the frame-shaped member 6, which is located at the top in FIG. 1, of the four frame-shaped members 6 are structured to be elastically deformable more easily in the X-axis direction than in the Y-axis direction and the Z-axis direction. Moreover, the first elastic members 51 connected to the frame-shaped member 6, which is located at the left in FIG. 1, of the four frame-shaped members 6 are structured to be elastically deformable more easily in the Y-axis direction than in the X-axis direction and the Z-axis direction. Further, the first elastic members 51 connected to the frame-shaped member 6, which is located at the bottom in FIG. 1, of the four frame-shaped members 6 are structured to be elastically deformable more easily in the X-axis direction than in the Y-axis direction and the Z-axis direction. Furthermore, the first elastic members 51 connected to the frame-shaped member 6, which is located at the right in FIG. 1, of the four frame-shaped members 6 are structured to be elastically deformable more easily in the Y-axis direction than in the X-axis direction and the Z-axis direction. The stiffness of the first elastic members 51 structured to be easily elastically deformable in the X-axis direction is less in the X-axis direction than in the Y-axis direction and the Z-axis direction. The stiffness of the first elastic members 51 structured to be easily elastically deformable in the Y-axis direction is less in the Y-axis direction than in the X-axis direction and the Z-axis direction.

Each of the plurality of first elastic members 51 is a spring. Each of the plurality of first elastic members 51 has a first folded part 513 in plan view in the thickness direction D1 defined with respect to the substrate 2. The first folded part 513 has a U-shape in plan view in the thickness direction D1 defined with respect to the substrate 2. Each of the plurality of first elastic members 51 has two first folded parts 513 and thus has a winding shape.

Each of the plurality of first elastic members 51 is located on the outer side of the weight member 4 in plan view in the thickness direction D1 defined with respect to the substrate 2.

Four first anchor members 71 each has a substantially quadrangular shape in plan view in the thickness direction D1 defined with respect to the substrate 2. The four first anchor members 71 are fixed to the substrate 2.

The four first anchor members 71 are arranged to, together with the four frame-shaped members 6, surround the weight member 4. In the structural component 3, the four first anchor members 71 and the four frame-shaped members 6 are alternately arranged one by one in an outer circumferential direction of the weight member 4. In this case, of the four first anchor members 71, two first anchor members 71 are aligned on a straight line including one diagonal line of the weight member 4 having a square shape, and remaining two first anchor member 71 are aligned on a straight line including the other diagonal line in plan view in the thickness direction D1 defined with respect to the substrate 2. In the angular velocity sensor 1 according to the first embodiment, the four first anchor members 71 are arranged one by one at four corners of the substrate 2.

Each of the four frame-shaped members 6 described above is supported by two adjacent first anchor members 71 of the first anchor members 71 via the second elastic members 52. In the angular velocity sensor 1, each of the four frame-shaped members 6 is connected to respective one ends of two second elastic members 52 of the second elastic members 52. In this case, the other ends of the two second elastic members 52 are connected to different anchor members 7.

Each of the four frame-shaped members 6 is displaceable in the prescribed direction in which the frame-shaped member 6 is aligned with the weight member 4, and each of the four frame-shaped members 6 is also displaceable in a direction orthogonal to the prescribed direction and the thickness direction D1 defined with respect to the substrate 2.

The second elastic members 52 are not fixed to the substrate 2 and are separate from the principal surface 21 of the substrate 2. Each second elastic member 52 connects the anchor member 7 and the frame-shaped member 6 which are adjacent to each other. That is, each anchor member 7 supports the frame-shaped members 6 via the second elastic members 52. Each second elastic member 52 is elastically deformable in the prescribed direction corresponding to the frame-shaped member 6 connected thereto. For example, two second elastic members 52 connected to the frame-shaped member 6, which is located at the top in FIG. 1, of the four frame-shaped members 6 are structured to be elastically deformable more easily in the Y-axis direction than in the X-axis direction and the Z-axis direction. Moreover, two second elastic members 52 connected to the frame-shaped member 6, which is located at the left in FIG. 1, of the four frame-shaped members 6 are structured to be elastically deformable more easily in the X-axis direction than in the Y-axis direction and the Z-axis direction. Further, two second elastic members 52 connected to the frame-shaped member 6, which is located at the bottom in FIG. 1, of the four frame-shaped members 6 are structured to be elastically deformable more easily in the Y-axis direction than in the X-axis direction and the Z-axis direction. Furthermore, two second elastic members 52 connected to the frame-shaped member 6, which is located at the right in FIG. 1, of the four frame-shaped members 6 are structured to be elastically deformable more easily in the X-axis direction than in the Y-axis direction and the Z-axis direction. The stiffness of the second elastic members 52 structured to be easily elastically deformable in the Y-axis direction is less in the Y-axis direction than in the X-axis direction and the Z-axis direction. The stiffness of the second elastic members 52 structured to be easily elastically deformable in the X-axis direction is less in the X-axis direction than in the Y-axis direction and the Z-axis direction.

Each of the plurality of second elastic members 52 is deflectable (elastically deformable). In this case, each of the plurality of second elastic members 52 has a second folded part 523 in plan view in the thickness direction D1 defined with respect to the substrate 2. The second folded part 523 has a U-shape in plan view in the thickness direction D1 defined with respect to the substrate 2. Each of the plurality of second elastic members 52 has one second folded part 523.

Each second anchor member 72 is fixed to the substrate 2 and is connected to one first anchor member 71, adjacent thereto, of the first anchor members 71. Each third anchor member 73 is fixed to the substrate 2 and is connected to one second anchor member 72, adjacent thereto, of the second anchor members 72.

The first anchor member 71 described above is aligned to the frame-shaped member 6 in a direction orthogonal to the prescribed direction in which the weight member 4 and the frame-shaped member 6 align with each other in plan view in the thickness direction D1 defined with respect to the substrate 2. The second anchor member 72 is located between the first anchor member 71 and the weight member 4 to be connected to the first anchor member 71 in plan view in the thickness direction D1 defined with respect to the substrate 2. Moreover, the third anchor member 73 is located between the second anchor member 72 and the weight member 4 to be connected to the second anchor member 72 in plan view in the thickness direction D1 defined with respect to the substrate 2.

Each first input electrode 81 is located on an outer side of a corresponding one of the frame-shaped members 6 to be separate from the corresponding one of the frame-shaped members 6 and is fixed to the substrate 2.

Each second input electrode 82 includes an electrode portion (second comb teeth 822) which is located on an outer side of a corresponding one of the frame-shaped members 6 and which is connected to the corresponding one of the frame-shaped members 6. Each second input electrode 82 faces a corresponding one of the first input electrodes 81. Each second input electrode 82 is displaceable in the prescribed direction corresponding to the frame-shaped member 6 connected thereto. For example, the second comb teeth 822 connected to the frame-shaped member 6, which is located at the top in FIG. 1, of the four frame-shaped members 6 are displaceable in the Y-axis direction, the second comb teeth 822 connected to the frame-shaped member 6 at the left are displaceable in the X-axis direction, the second comb teeth 822 connected to the frame-shaped member 6 at the bottom is displaceable in the Y-axis direction, and the second comb teeth 822 connected to the frame-shaped member 6 at the right are displaceable in the X-axis direction.

The drive portions 8 drive the weight member 4 such that the weight member 4 vibrates. Each drive portion 8 includes the first input electrode 81 and the second input electrode 82. Note that each drive portion 8 has a function of converting an electric signal (an electric quantity) input between the first input electrode 81 and the second input electrode 82 into displacement (a mechanical amount) of the second input electrode 82.

Each first input electrode 81 is a comb electrode and has: a first comb base part 811 facing a corresponding one of the frame-shaped members 6; and a plurality of first comb teeth 812 extending from the first comb base part 811 toward the corresponding one of the frame-shaped members 6 in plan view in the thickness direction D1 defined with respect to the substrate 2.

Each second input electrode 82 is a comb electrode and has: a second comb base part 821 including a part (part of the frame piece 61) facing the first comb base part 811 of the frame-shaped member 6; and the plurality of second comb teeth 822 (the electrode portion) extending from the second comb base part 821 toward the first comb base part 811 in plan view in the thickness direction D1 defined with respect to the substrate 2.

In each drive portion 8, the plurality of first comb teeth 812 and the plurality of second comb teeth 822 are alternately aligned one by one to be separate from each other in a direction orthogonal to a direction in which the first comb base part 811 and the second comb base part 821 face each other in plan view in the thickness direction D1 defined with respect to the substrate 2. That is, each first comb tooth 812 and its adjacent second comb tooth 822 face each other with a gap provided therebetween.

Each detecting portion 9 outputs an electric signal according to an angular velocity as a sensing target by outputting an electric signal relating to the motion of the weight member 4 when rotational force (an angular velocity) externally acts on the weight member 4. As described above, each detecting portion 9 includes the first reference electrode 91 and the second reference electrode 92. Note that each detecting portion 9 has a function of converting displacement (a mechanical amount) of the second reference electrode 92 with respect to the first reference electrode 91 into an electric signal (an electric quantity) between the first reference electrode 91 and the second reference electrode 92.

Each first reference electrode 91 is located on an inner side of a corresponding one of the frame-shaped members 6 and is fixed to the substrate 2.

Each second reference electrode 92 includes an electrode portion (second comb teeth 922) which is located on an inner side of a corresponding one of the frame-shaped members 6 and which is connected to the corresponding one of the frame-shaped members 6. Each second reference electrode 92 faces a corresponding one of the first reference electrodes 91. Each second reference electrode 92 is displaceable in the prescribed direction corresponding to the frame-shaped member 6 connected thereto. For example, an electrode part (the second comb teeth 922) connected to the frame-shaped member 6, which is located at the top in FIG. 1, of the four frame-shaped members 6 is displaceable in the Y-axis direction. Moreover, an electrode part (the second comb teeth 922) connected to the frame-shaped member 6, which is located at the left in FIG. 1, of the four frame-shaped members 6 is displaceable in the X-axis direction. Further, the second comb teeth 922 connected to the frame-shaped member 6, which is located at the bottom in FIG. 1, of the four frame-shaped members 6 are displaceable in the Y-axis direction. Furthermore, the second comb teeth 922 connected to the frame-shaped member 6, which is located at the right in FIG. 1, of the four frame-shaped members 6 are displaceable in the X-axis direction.

The first reference electrode 91 has a comb shape in plan view in the thickness direction D1 defined with respect to the substrate 2. Each first reference electrode 91 has: a first comb base part 911 disposed in a direction in which the weight member 4 and a corresponding one of the frame-shaped members 6 are aligned; and a plurality of (in the example shown in the figure, six) first comb teeth 912 extending from the first comb base part 911 toward parts (the frame pieces 63 and 64) facing the first comb base part 911 of the corresponding one of the frame-shaped members 6 in plan view in the thickness direction D1 defined with respect to the substrate 2. The six first comb teeth 912 includes: three first comb teeth 912 extending toward one frame piece 63 of the four frame pieces 61 to 64 of the frame-shaped member 6; and three first comb teeth 912 extending toward the frame piece 64.

Each second reference electrode 92 has: a base 921 constituted by a corresponding one of the frame-shaped members 6; and a plurality of (in the example shown in the figure, four) second comb teeth 922 extending from the base 921 toward the first comb base part 911 of the first reference electrode 91. That is, in the angular velocity sensor 1, each frame-shaped member 6 serves also as a part (the base 921) of a corresponding one of the second reference electrodes 92. In this case, in the second reference electrode 92, two second comb teeth 922 extend from each of the two frame pieces 63 and 64 of the frame-shaped member 6 toward the first comb base part 911. Moreover, in the second reference electrode 92, the two frame pieces 61 and 62 serve also as second comb teeth respectively extending from the two frame pieces 63 and 64.

In each detecting portion 9, the plurality of first comb teeth 912 and the plurality of second comb teeth 922 are alternately aligned one by one separately from each other, in a direction orthogonal to a direction in which the first comb teeth 912 extend, in plan view in the thickness direction D1 defined with respect to the substrate 2. In this case, each second comb tooth 922 is disposed such that of the two first comb teeth 912 adjacent thereto, the distance to the first comb tooth 912 farther separate from the weight member 4 is greater than the distance to the first comb tooth 912 closer to the weight member 4. Moreover, in the second reference electrode 92, the two frame pieces 61 and 62 serve also as second comb teeth respectively extending from the two frame pieces 63 and 64.

Moreover, in the angular velocity sensor 1, the structural component 3 further includes projections 65. Each projection 65 protrudes from a corresponding one of the frame-shaped members 6 toward the first anchor member 71 adjacent to the corresponding one of the frame-shaped members 6. Each first anchor member 71 has a recess 75 in which a corresponding one of the projections 65 is located. In plan view in the thickness direction D1 defined with respect to the substrate 2, a gap is provided between each projection 65 and each recess 75. The projections 65 are not fixed to the substrate 2. In the angular velocity sensor 1, displacement of the frame-shaped member 6 as a result of vibration of the weight member 4 brings the projection 65 into contact with an inner side surface of the recess 75, which restricts the amount of displacement of the frame-shaped member 6.

In FIG. 1, of the structural component 3, components fixed to the substrate 2 and components which are not fixed to the substrate 2 are distinguished by the types of hatching with dots. That is, in FIG. 1, components (the first anchor members 71, the second anchor members 72, the third anchor members 73, the first input electrodes 81, and the first reference electrodes 91) hatched with a relatively high density of dots are fixed to the substrate 2, whereas components (the weight member 4, the first elastic members 51, the second elastic members 52, the frame-shaped members 6, the projections 65, the second input electrodes 82, and the second reference electrodes 92) hatched with a relatively low density of dots are not fixed to the substrate 2.

In the angular velocity sensor 1, the weight member 4, eight first elastic members 51, the four frame-shaped members 6, four second input electrodes 82, four second reference electrodes 92, eight second elastic members 52, the four first anchor members 71, four second anchor members 72, and four third anchor members 73 are integrated with each other. Moreover, in the angular velocity sensor 1, four first input electrodes 81 and four first reference electrodes 91 are independent of one another. Further, in the angular velocity sensor 1, the weight member 4, the eight first elastic members 51, the eight second elastic members 52, the four frame-shaped members 6, the eight projections 65, the four second input electrodes 82, and the four second reference electrodes 92 have the same dimension in the Z-axis direction along the thickness direction D1 defined with respect to the substrate 2. Furthermore, in the angular velocity sensor 1, the four first anchor members 71, the four second anchor members 72, the four third anchor members 73, the four first input electrodes 81, and the four first reference electrodes 91 have the same dimension in the Z-axis direction along the thickness direction D1 defined with respect to the substrate 2.

The angular velocity sensor 1 according to the first embodiment is formed by processing, for example, a Silicon on Insulator (SOI) wafer by a manufacturing technology or the like of Micro Electro Mechanical Systems (MEMS). The SOI wafer includes a silicon substrate, an insulating layer (e.g., an embedded oxide film) formed on the silicon substrate, and a silicon layer formed on the insulating layer. In the angular velocity sensor 1 according to the first embodiment, part of the silicon substrate of the SOI wafer constitutes the substrate 2, and part of the silicon layer constitutes the structural component 3. Thus, the material for the structural component 3 includes silicon. The silicon layer described above includes an impurity, and the structural component 3 has a conductive property. The angular velocity sensor 1 according to the first embodiment includes an insulation unit 23 provided between the principal surface 21 of the substrate 2 and each of the plurality of components (the anchor members 7, the first input electrodes 81, the first reference electrodes 91, and the like) of the structural component 3 which are fixed to the substrate 2. Moreover, the angular velocity sensor 1 according to the first embodiment has a space 24 between the substrate 2 and each of the plurality of components (the weight member 4, the elastic members 5, the frame-shaped members 6, the second input electrodes 82, the second reference electrode 92, and the like) which are not fixed to the substrate 2. Each insulation unit 23 is constituted by part of the insulating layer of the SOI wafer. Of the structural component 3, the plurality of components fixed to the substrate 2 are fixed to the substrate 2 via the insulation units 23.

The angular velocity sensor 1 is housed in, for example, a package and is used in this state, but this should not be construed as limiting, and the angular velocity sensor 1 may include, for example, a chip size package formed by a wafer level packaging technology or the like. The package has an interior space which is, for example, a nitrogen gas atmosphere or a reduced-pressure atmosphere (vacuum), and the space 24 between the structural component 3 and the substrate 2 is also a nitrogen gas atmosphere or a reduced-pressure atmosphere (vacuum).

(2.2) Operation of Angular Velocity Sensor

The angular velocity sensor 1 according to the first embodiment senses an angular velocity around the Z-axis, for example, by using Coriolis force (deflecting force) acting on the weight member 4 in a state where the weight member 4 vibrates in the X-axis direction.

Specifically, for example, when a drive circuit applies a driving voltage signal between the first input electrode 81 and the second input electrode 82 of each of the drive portions 8 at the left and the right in FIG. 1, electrostatic force is generated between the first input electrode 81 and the second input electrode 82, which vibrates the weight member 4 in the X-axis direction.

In this way, it is assumed that in the state where the weight member 4 vibrates in the X-axis direction, the angular velocity around the Z-axis acts on the weight member 4 of the angular velocity sensor 1. In this case, the Coriolis force (deflecting force) acts on the weight member 4, and thereby, the weight member 4 vibrates in the Y-axis direction, so that each of the frame-shaped members 6 at the top and the bottom in FIG. 1 vibrates in the Y-axis direction.

When two frame-shaped members 6 aligned in the Y-axis direction vibrate in the Y-axis direction, a change is caused in a gap length between the first reference electrode 91 and the second reference electrode 92 of the detecting portion 9 corresponding to each of the two frame-shaped members 6. The change in the gap length is output as a change in electrostatic capacitance to a processing circuit. As a result, an electric signal corresponding to the angular velocity around the Z-axis acting on the angular velocity sensor 1 (the weight member 4) is output from the detecting portion 9 (the first reference electrode 91 and the second reference electrode 92). Note that the detecting portion 9 adjacent to the drive portion 8 to which a voltage is input can be used to monitor displacement during driving.

The angular velocity sensor 1 is electrically connected to, for example, a signal processing device and is used in this state. The signal processing device is, for example, an Application Specific Integrated Circuit (ASIC). The signal processing device includes, for example, a drive circuit and a processing circuit. The drive circuit gives the driving voltage signal to the angular velocity sensor 1. The processing circuit performs signal processing of the electric signal output from the angular velocity sensor 1. For example, the processing circuit can convert an analog electric signal (an analog signal) output from the angular velocity sensor 1 into a digital signal and perform an appropriate arithmetic process to obtain angular velocity around the Z-axis.

(2.3) Layout of Structural Component in Angular Velocity Sensor

In the structural component 3, the first input electrode 81 and the electrode portion (the second comb teeth 822) of the second input electrode 82 are located between the frame-shaped member 6 and the weight member 4 in the prescribed direction in plan view in the thickness direction D1 defined with respect to the substrate 2. Thus, in the angular velocity sensor 1 according to the first embodiment, the first reference electrode 91 and the second reference electrode 92 are farther away from the weight member 4 than the first input electrode 81 and the electrode portion (the second comb teeth 822) of the second input electrode 82 are. Thus, in the angular velocity sensor 1 according to the first embodiment, it becomes easy to increase an area occupied by the first reference electrode 91 and the second reference electrode 92 in plan view in the thickness direction D1 defined with respect to the substrate 2, and it becomes easy to further increase a facing area of the first reference electrode 91 and the second reference electrode 92. Thus, in the angular velocity sensor 1 according to the first embodiment, it becomes easy to increase the capacitance of the capacitor including the first reference electrode 91 and the second reference electrode 92.

(3) Advantages

In the angular velocity sensor 1 according to the first embodiment, the first input electrode 81 and the electrode portion (the second comb teeth 822) of the second input electrode 82 are located between the frame-shaped member 6 and the weight member 4 in the prescribed direction in plan view in the thickness direction D1 defined with respect to the substrate 2, and therefore, the angular velocity sensor 1 can be improved in sensitivity with its size being reduced.

Second Embodiment

Figure 5:
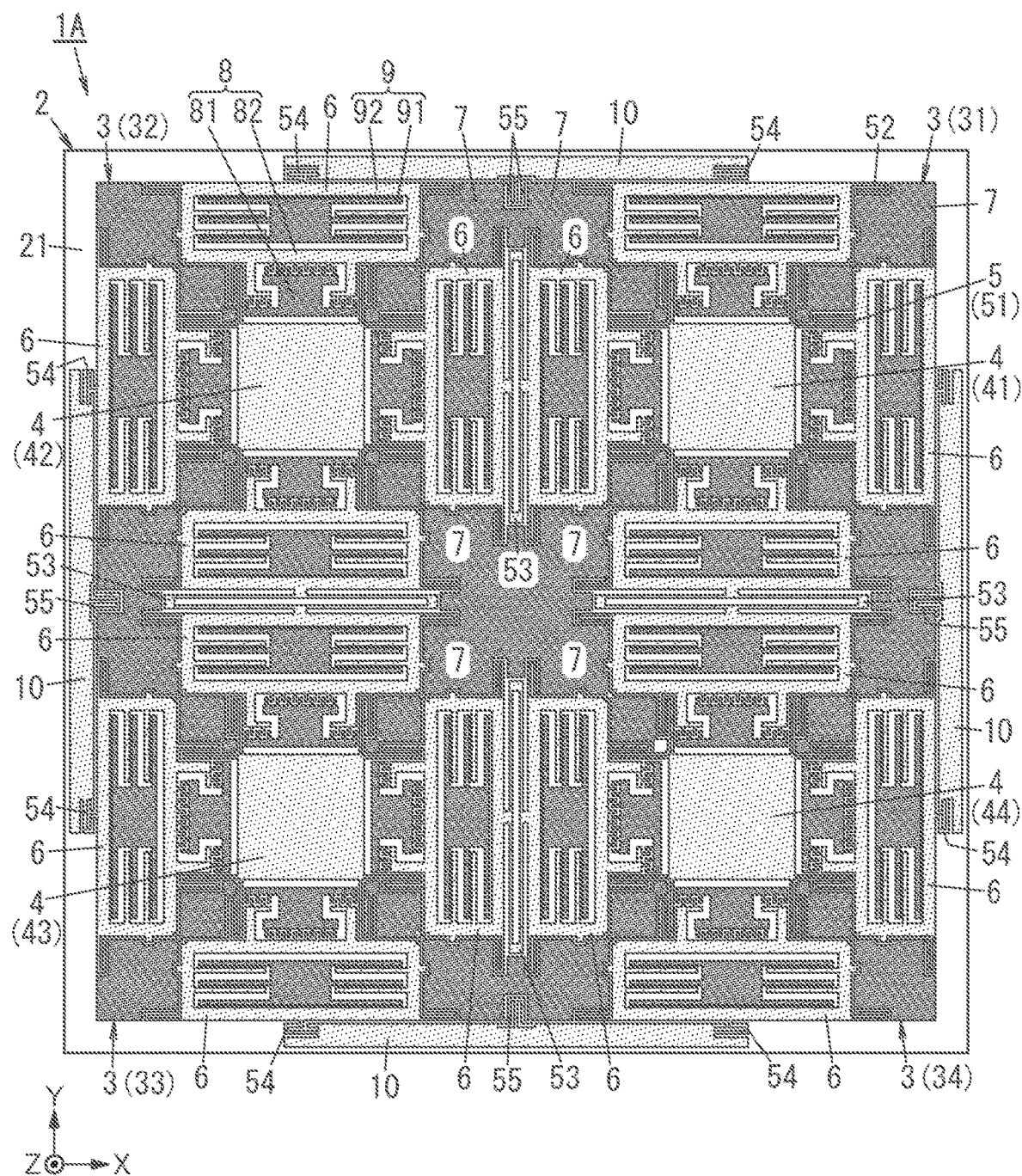
FIG. 5 is a plan view of the angular velocity sensor according to the second embodiment.
Figure 6:
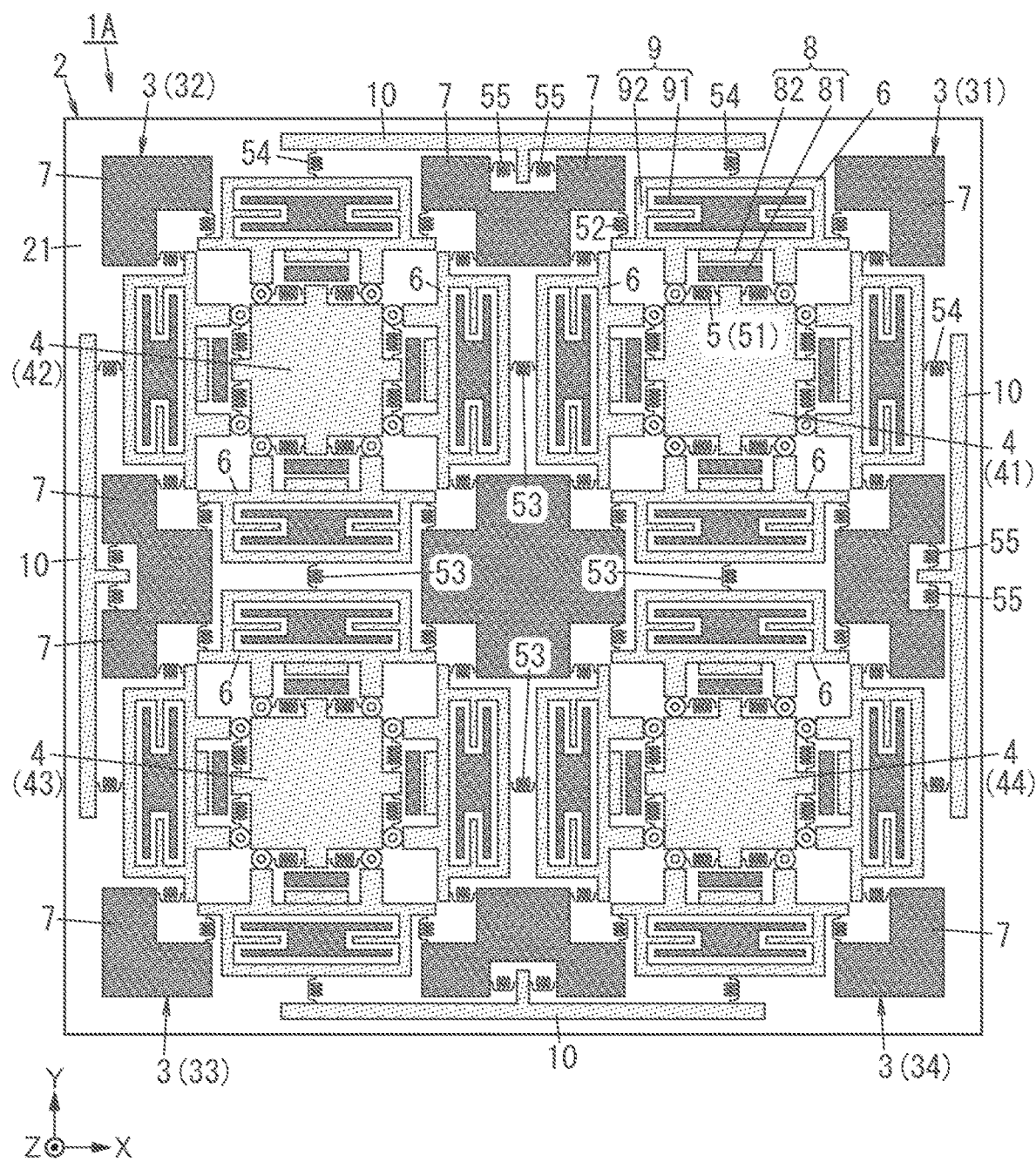
FIG. 6 is a view of the angular velocity sensor, wherein the plan view corresponding to FIG. 5 is shown in a further schematized manner.

With reference to FIGS. 5 and 6, an angular velocity sensor 1A according to a second embodiment will be described below. In the angular velocity sensor 1A according to the second embodiment, components similar to those in the angular velocity sensor 1 according to the first embodiment are denoted by the same reference signs as those in the first embodiment, and the description thereof will be omitted.

The angular velocity sensor 1A according to the second embodiment is different from the angular velocity sensor 1 according to the first embodiment, for example, in that four structural components 3 of the angular velocity sensor 1 according to the first embodiment are provided at the side of a principal surface 21 of a substrate 2.

In the angular velocity sensor 1A according to the second embodiment, the four structural components 3 are arranged in a 2x2 two-dimensional array (a matrix), and the four structural components 3 are integrated with each other at the side of the principal surface 21 of the substrate 2. The angular velocity sensor 1A according to the second embodiment further includes third elastic members 53. More specifically, the angular velocity sensor 1A includes four third elastic members 53. Each of the four third elastic members 53 connects the frame-shaped members 6, which are closest to each other, of corresponding two adjacent structural components 3 of the structural components 3 in plan view in the thickness direction D1 (see FIGS. 2 and 3) of the substrate 2, and each of the four third elastic members 53 is elastically deformable in a direction in which the frame-shaped members 6 closest to each other are aligned with each other. Each of the third elastic members 53 has a loop part elongated in a direction orthogonal to the direction in which the frame-shaped members 6 closest to each other are aligned with each other.

When the four structural components 3 are distinguished from one another in the following description, the structural component 3 at the top right in FIG. 5 may be referred to as a structural component 31, the structural component 3 at top left may be referred to as a structural component 32, the structural component 3 at the bottom left may be referred to as a structural component 33, and the structural component 3 at the bottom right may be referred to as a structural component 34 for convenience of explanation. Similarly, when four weight members 4 are distinguished from one another, the weight member 4 at the top right in FIG. 5 may be referred to as a weight member 41, the weight member 4 at the top left may be referred to as a weight member 42, the weight member 4 at the bottom left may be referred to as a weight member 43, and the weight member 4 at the bottom right may be referred to as a weight member 44.

In the angular velocity sensor 1A, the third elastic member 53 connecting the frame-shaped members 6, which are closest to each other, of the structural component 31 and the structural component 32 aligned in the X-axis direction is structured to be elastically deformable more easily in the X-axis direction than in the Y-axis direction and the Z-axis direction. Moreover, in the angular velocity sensor 1A, the third elastic member 53 connecting the frame-shaped members 6, which are closest to each other, of the structural component 33 and the structural component 34 aligned in the X-axis direction is structured to be elastically deformable more easily in the X-axis direction than in the Y-axis direction and the Z-axis direction. Further, in the angular velocity sensor 1A, the third elastic member 53 connecting the frame-shaped members 6, which are closest to each other, of the structural component 31 and the structural component 34 aligned in the Y-axis direction is structured to be elastically deformable more easily in the Y-axis direction than in the X-axis direction and the Z-axis direction. Furthermore, in the angular velocity sensor 1A, the third elastic member 53 connecting the frame-shaped members 6, which are closest to each other, of the structural component 32 and the structural component 33 aligned in the Y-axis direction is structured to be elastically deformable more easily in the Y-axis direction than in the X-axis direction and the Z-axis direction.

The angular velocity sensor 1A includes the third elastic members 53 each connecting the frame-shaped members 6, which are closest to each other, of two adjacent structural components 3, which enables the weight members 4 of the two adjacent structural components 3 to vibrate in synchronization with each other in opposite phases.

Moreover, the angular velocity sensor 1A according to the second embodiment further includes a lever-arm member 10, a pair of fourth elastic members 54, and a pair of fifth elastic members 55. The angular velocity sensor 1A includes four synchronization sets each including one lever-arm member 10, a pair of fourth elastic members 54, and a pair of fifth elastic members 55.

The lever-arm member 10 is elongated in plan view in the thickness direction D1 defined with respect to the substrate 2. The lever-arm member 10 is aligned with two adjacent structural components 3 in plan view in the thickness direction D1 defined with respect to the substrate 2. The pair of fourth elastic members 54 connect both ends in a longitudinal direction of the lever-arm member 10 to the frame-shaped members 6, which are closest to the lever-arm member 10, of the two structural components 3. The pair of fourth elastic members 54 are structured to be easily elastically deformable in a prescribed direction corresponding to the frame-shaped members 6. The pair of fifth elastic members 55 connect a central part in the longitudinal direction of the lever-arm member 10 to anchor members 7, which are closest to the central part of the lever-arm member 10, of the two structural components 3. The pair of fifth elastic members 55 are structured to be easily elastically deformable in a direction orthogonal to the thickness direction D1 defined with respect to the substrate 2 and the prescribed direction.

The pair of fourth elastic members 54 are elastically deformable in the prescribed direction corresponding to the frame-shaped members 6 connected thereto. In this case, the pair of fourth elastic members 54 connected to the lever-arm member 10 at the top in FIG. 5 are structured to be elastically deformable more easily in the Y-axis direction than in the X-axis direction and the Z-axis direction. Moreover, the pair of fourth elastic members 54 connected to the lever-arm member 10 at the bottom in FIG. 5 are structured to be elastically deformable more easily in the Y-axis direction than in the X-axis direction and the Z-axis direction. Further, the pair of fourth elastic members 54 connected to the lever-arm member 10 at the left in FIG. 5 are structured to be elastically deformable more easily in the X-axis direction than in the Y-axis direction and the Z-axis direction. Furthermore, the pair of fourth elastic members 54 connected to the lever-arm member 10 at the right in FIG. 5 are structured to be elastically deformable more easily in the X-axis direction than in the Y-axis direction and the Z-axis direction. The stiffness of the fourth elastic members 54 structured to be easily elastically deformable in the Y-axis direction is less in the Y-axis direction than in the X-axis direction and the Z-axis direction. The stiffness of the fourth elastic members 54 structured to be easily elastically deformable in the X-axis direction is less in the X-axis direction than in the Y-axis direction and the Z-axis direction.

Each of a plurality of (eight) fourth elastic members 54 is a spring. Each of the plurality of fourth elastic members 54 has a folded part in plan view in the thickness direction D1 defined with respect to the substrate 2. The folded part has a U-shape in plan view in the thickness direction D1 defined with respect to the substrate 2. Each of the plurality of fourth elastic members 54 has one folded part.

The pair of fifth elastic members 55 are elastically deformable in a direction orthogonal to the prescribed direction corresponding to the frame-shaped members 6 connected via the lever-arm member 10 and the thickness direction D1 defined with respect to the substrate 2. In this case, the pair of fifth elastic members 55 connected to the lever-arm member 10 at the top in FIG. 5 are structured to be elastically deformable more easily in the X-axis direction than in the Y-axis direction and the Z-axis direction. Moreover, the pair of fifth elastic members 55 connected to the lever-arm member 10 at the bottom in FIG. 5 are structured to be elastically deformable more easily in the X-axis direction than in the Y-axis direction and the Z-axis direction. Further, the pair of fifth elastic members 55 connected to the lever-arm member 10 at the left in FIG. 5 are structured to be elastically deformable more easily in the Y-axis direction than in the X-axis direction and the Z-axis direction. Furthermore, the pair of fifth elastic members 55 connected to the lever-arm member 10 at the right in FIG. 5 are structured to be elastically deformable more easily in the Y-axis direction than in the X-axis direction and the Z-axis direction. The stiffness of the fifth elastic members 55 structured to be easily elastically deformable in the X-axis direction is less in the X-axis direction than in the Y-axis direction and the Z-axis direction. The stiffness of the fifth elastic members 55 structured to be easily elastically deformable in the Y-axis direction is less in the Y-axis direction than in the X-axis direction and the Z-axis direction.

Each of a plurality of (eight) fifth elastic members 55 is a spring. Each of the plurality of fifth elastic members 55 has a folded part in plan view in the thickness direction D1 defined with respect to the substrate 2. The folded part has a U-shape in plan view in the thickness direction D1 defined with respect to the substrate 2. Each of the plurality of fifth elastic members 55 has one folded part.

In the angular velocity sensor 1A, the four third elastic members 53, four lever-arm members 10, the eight fourth elastic members 54, and the eight fifth elastic members 55 are components which are not fixed to the substrate 2 and are separated from the principal surface 21 of the substrate 2 in the thickness direction D1 (see FIGS. 2 and 3) of the substrate 2.

In the angular velocity sensor 1A according to the second embodiment, the four third elastic members 53, the four lever-arm members 10, the eight fourth elastic members 54, and the eight fifth elastic members 55 have the same dimension in the Z-axis direction along the thickness direction D1 defined with respect to the substrate 2 and have the same dimension in the Z-axis direction as the other components which are not fixed to the substrate 2. This facilitates the production and design regarding stiffness and the like of the angular velocity sensor 1A. In the angular velocity sensor 1A, the four structural components 3, the four third elastic members 53, the four lever-arm members 10, the eight fourth elastic members 54, and the eight fifth elastic members 55 are constituted by different parts of a silicon layer of a SIM wafer.

FIG. 6 is a schematic diagram schematically showing the configuration of the angular velocity sensor 1A according to the second embodiment. In FIG. 6, the shape and the like of each component may be different from the actual shape and the like. For example, in FIG. 6, the first elastic members 51, the second elastic members 52, the third elastic members 53, the fourth elastic members 54, and the fifth elastic members 55 are schematically represented by "spring" symbols, which do not represent the actual shape of the first elastic members 51, the second elastic members 52, the third elastic members 53, the fourth elastic members 54, and the fifth elastic members 55. Note that a direction in which one end and the other end of each "spring" symbol are aligned corresponds to a direction in which elastic deformation easily occurs.

The angular velocity sensor 1A according to the second embodiment is configured to individually vibrate the four weight members 41 to 44. In the angular velocity sensor 1A, for example, when the weight member 41 and the weight member 42 move toward each other, the weight member 43 and the weight member 44 move to be separate from each other, whereas when the weight member 41 and the weight member 42 move to be separate from each other, the weight member 43 and the weight member 44 move toward each other. Moreover, in the angular velocity sensor 1A, for example, when the weight member 41 and the weight member 44 move toward each other, the weight member 42 and the weight member 43 move to be separate from each other, whereas when the weight member 41 and the weight member 44 move to be separate from each other, the weight member 42 and the weight member 43 move toward each other. In sum, in the angular velocity sensor 1A according to the second embodiment, the weight members 4 of two structural components 3, which are aligned in a row direction (the X-axis direction), of the four structural components 3 aligned in the 2x2 two-dimensional array move in an anti-phase in a synchronized manner, the weight members 4 of two structural components 3 aligned in a column direction (the Y-axis direction) move in an anti-phase in a synchronized manner, and the weight members 4 of two structural components 3 aligned in a diagonal direction move in an in-phase in a synchronized manner. The synchronization sets described above each including the lever-arm member 10, the pair of fourth elastic members 54, and the pair of fifth elastic members 55 constitute a lever mechanism for driving and synchronizing of the weight members 4 of the two adjacent structural components 3 in an anti-phase. Thus, in the angular velocity sensor 1A, the signal processing device vibrates and synchronize the weight members 4 of the two adjacent structural components 3 in an anti-phase. In this case, the signal processing device is configured to individually control the drive portions 8 of the four structural components 3, and the processing circuit is configured to perform differential detection based on outputs of the detecting portions 9 corresponding to the weight members 4 having different phases.

In the angular velocity sensor 1A according to the second embodiment, similarly to the angular velocity sensor 1 of the first embodiment, the first input electrode 81 and the electrode portion (the second comb teeth 822) of the second input electrode 82 are located between the frame-shaped member 6 and the weight member 4 in the prescribed direction in plan view in the thickness direction D1 defined with respect to the substrate 2, and therefore, the angular velocity sensor 1A can be improved in sensitivity with its size being reduced.

Figure 7:
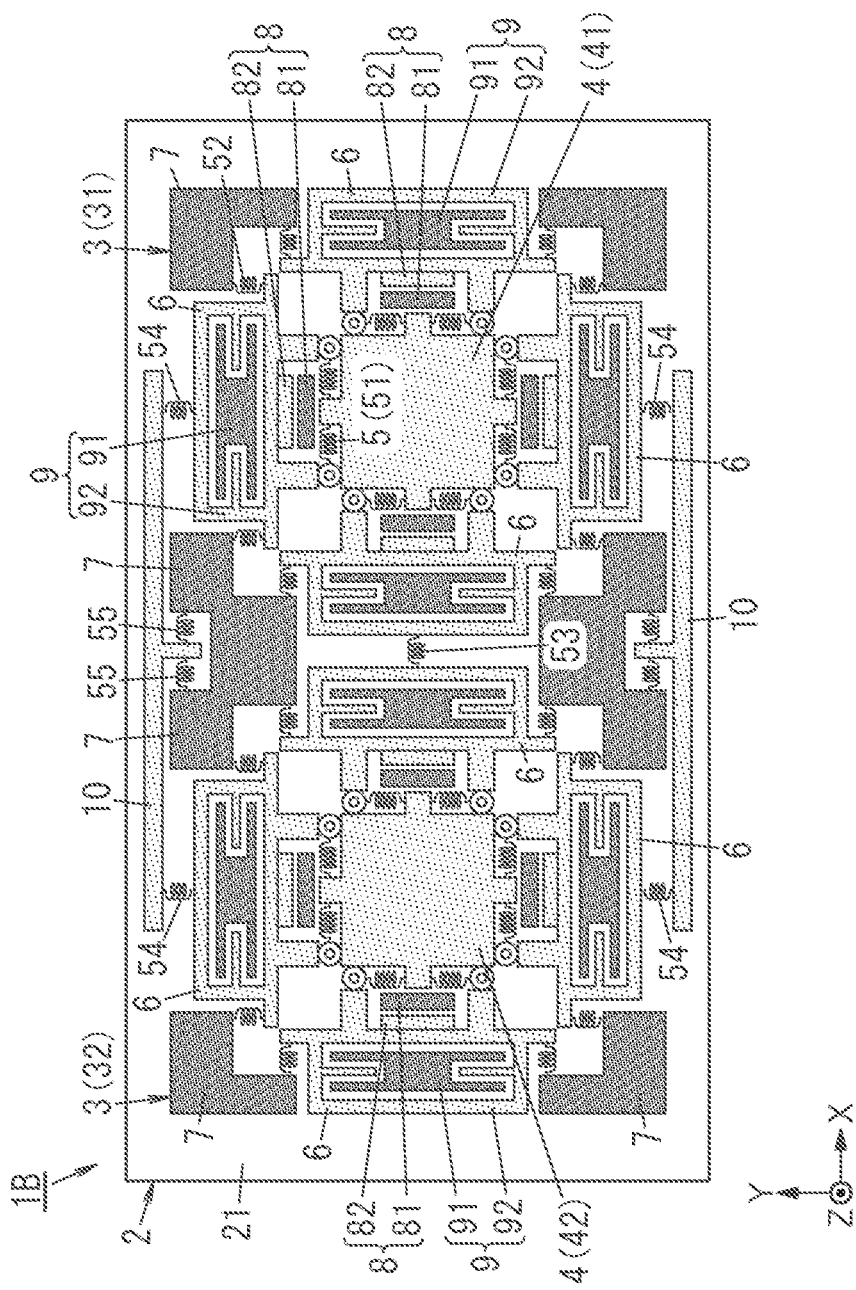
FIG. 7 is a schematic diagram of an angular velocity sensor according to a variation of the second embodiment.

FIG. 7 is a schematic diagram schematically showing an angular velocity sensor 1B according to a first variation of the second embodiment. The angular velocity sensor 1B according to the first variation is different from the angular velocity sensor 1A according to the second embodiment in that two structural components 3, but not the four structural components 3, are integrated with each other. In the angular velocity sensor 1B according to the first variation of the second embodiment, components similar to those in the angular velocity sensor 1A according to the second embodiment are denoted by the same reference signs as those in the second embodiment, and the description thereof will be omitted. Note that FIG. 7 is a schematic diagram schematically showing the configuration of the angular velocity sensor 1B. In FIG. 7, the shape and the like of each component may be different from the actual shape and the like.

In the angular velocity sensor 1B according to the first variation of the second embodiment, similarly to the angular velocity sensor 1 of the first embodiment, the first input electrode 81 and the electrode portion (the second comb teeth 822) of the second input electrode 82 are located between the frame-shaped member 6 and the weight member 4 in the prescribed direction in plan view in the thickness direction D1 defined with respect to the substrate 2, and therefore, the angular velocity sensor 1B can be improved in sensitivity with its size being reduced.

(Variations)

The embodiments are mere examples of various embodiments of the present disclosure. Various modifications are possible depending on design and the like as long as the object of the present disclosure is achieved.

As long as the outer peripheral shape of the weight member 4 in plan view in the thickness direction D1 defined with respect to the substrate 2 is the polygonal shape, it is not limited to the square shape but may be, for example, a hexagonal shape. Moreover, the outer peripheral shape of the weight member 4 is not limited to the polygonal shape but may be, for example, a circular shape.

Moreover, the angular velocity sensors 1, 1A, and 1B are not necessarily produced by using a SOI wafer but may be produced by, for example, using a silicon wafer and a glass wafer by a production technology of a MEMS, an anode bonding technology, and the like. The material for the glass wafer is, for example, borosilicate glass.

Moreover, in the structural component 3, the number of first folded parts 513 of each first elastic member 51 is different from the number of second folded parts 523 of the second elastic member 52, but this should not be construed as limiting, and the number of first folded parts 531 may be the same as the number of the second folded parts 523.

Moreover, as long as the first elastic member 51 has a meandering shape in plan view, the shape of the first elastic member 51 is not limited to the winding shape but may be a wave shape (e.g., a sine wave shape). Moreover, the shape of the first elastic member 51 is not limited to the meandering shape but may be, for example, a shape having one or more loop parts. The opening shape of each loop part is not limited to a rectangular shape but may be, for example, an ellipse shape, a rhombic shape, or a hexagonal shape.

Moreover, the shape of the second elastic members 52 to the fifth elastic members 55 is not limited to the meandering shape but may be, for example, a shape having one or more loop parts. Further, the first elastic members 51, the second elastic members 52, the third elastic members 53, the fourth elastic members 54, and the fifth elastic members 55 are not limited to springs but are at least elastic bodies. Furthermore, the number of each of the first elastic members 51, the second elastic members 52, the third elastic members 53, the fourth elastic members 54, and the fifth elastic members 55 may be accordingly modified.

Moreover, the material for the first elastic members 51, the second elastic members 52, the third elastic members 53, the fourth elastic members 54, and the fifth elastic members 55 is not limited to silicon but may be, for example, metal, an alloy, a conductive property resin, or the like.

Moreover, each frame-shaped member 6 is not limited to a fully closed frame in plan view in the thickness direction D1 defined with respect to the substrate 2 but may have a frame shape partially cut off, and may be, for example, C-shape or U-shape. Moreover, the plurality of frame-shaped members 6 are not limited to have the same shape but may have different shapes.

(Aspects)

An angular velocity sensor (1; 1A; 1B) according to a first aspect includes a substrate (2) and a structural component (3). The structural component (3) is provided at a side of a principal surface (21) of the substrate (2). The structural component (3) includes a weight member (4), a frame-shaped member (6), an elastic member (5), an anchor member (7), a first input electrode (81), a second input electrode (82), a first reference electrode (91), and a second reference electrode (92). The frame-shaped member (6) is aligned with the weight member (4) in a prescribed direction orthogonal to a thickness direction (D1) defined with respect to the substrate (2) and is displaceable in the prescribed direction. The elastic member (5) connects the weight member (4) to the frame-shaped member (6) and is elastically deformable in a direction orthogonal to the thickness direction (D1) defined with respect to the substrate (2) and the prescribed direction. The anchor member (7) supports the frame-shaped member (6) and is fixed to the substrate (2). The first input electrode (81) is located on an outer side of the frame-shaped member (6) to be separate from the frame-shaped member (6) and is fixed to the substrate (2). The second input electrode (82) includes an electrode portion (second comb teeth 822) located on the outer side of the frame-shaped member (6) and is connected to the frame-shaped member (6). The second input electrode (82) faces the first input electrode (81) and is displaceable in the prescribed direction. The first reference electrode (91) is located on an inner side of the frame-shaped member (6) and is fixed to the substrate (2). The second reference electrode (92) includes an electrode portion (second comb teeth 922) located on the inner side of the frame-shaped member (6) and is connected to the frame-shaped member (6). The second reference electrode (92) faces the first reference electrode (91) and is displaceable in the prescribed direction. In the structural component (3), the first input electrode (81) and the electrode portion (the second comb teeth 822) of the second input electrode (82) are located between the frame-shaped member (6) and the weight member (4) in the prescribed direction in plan view in the thickness direction (D1) defined with respect to the substrate (2).

The angular velocity sensor (1; 1A; 1B) of the first aspect is improved in sensitivity with its size being reduced.

In an angular velocity sensor (1; 1A; 1B) of a second aspect referring to the first aspect, the weight member (4) has an outer peripheral shape which is a polygonal shape in plan view in the thickness direction (D1) defined with respect to the substrate (2). The structural component (3) includes a plurality of sets each including the elastic member (5), the frame-shaped member (6), the first input electrode (81), the second input electrode (82), the first reference electrode (91), and the second reference electrode (92). The plurality of sets are arranged such that the second input electrodes (82) face sides of the polygonal shape on a one-to-one basis on an outer side of the weight member (4).

In the angular velocity sensor (1; 1A; 1B) of the second aspect, vibration of the weight member (4) in a state where no angular velocity acts on the weight member (4) is stabilized, thereby improving performance.

In an angular velocity sensor (1; 1A; 1B) of a third aspect referring to the first or second aspect, the elastic member (5) is located on an outer side of the weight member (4).

In the angular velocity sensor (1; 1A; 1B) of the third aspect, distortion of the weight member (4) is suppressed, thereby improving performance as compared to, for example, a case where the weight member (4) has a cut-off, and the elastic member (5) is in the cut-off.

In an angular velocity sensor (1; 1A; 1B) of a fourth aspect referring to any one of the first to third aspects, the structural component (3) further includes a projection (65). The projection (65) protrudes from the frame-shaped member (6) toward the anchor member (7). The anchor member (7) has a recess (75) in which the projection (65) is located. A gap is provided between the projection (65) and the recess (75) in plan view in the thickness direction (D1) defined with respect to the substrate (2).

In the angular velocity sensor (1; 1A; 1B) according to the fourth aspect, the projection (65) brought into contact with the recess (75) restricts displacement of the frame-shaped member (6) and prevents the elastic member (5) and the like from being damaged. Moreover, in the angular velocity sensor (1; 1A; 1B) of the fourth aspect, distortion of the frame-shaped member (6) is reduced, thereby improving performance as compared to a case where the projection (65) protrudes from the anchor member (7) and the frame-shaped member (6) has the recess (75).

In an angular velocity sensor (1; 1A; 1B) of a fifth aspect referring to any one of the first to fourth aspects, a first anchor member (71) as the anchor member (7) is adjacent to the frame-shaped member (6) in a direction orthogonal to the prescribed direction in plan view in the thickness direction (D1) defined with respect to the substrate (2) in plan view. The structural component (3) further includes a second anchor member (72). The second anchor member (72) is fixed to the substrate (2), is located between the first anchor member (71) and the weight member (4), and is connected to the first anchor member (71) in plan view in the thickness direction (D1) defined with respect to the substrate (2).

In the angular velocity sensor (1; 1A; 1B) of the fifth aspect, the substrate (2) more stably supports the structural component (3), thereby improving performance.

In an angular velocity sensor (1; 1A; 1B) of a sixth aspect referring to the fifth aspect, the structural component (3) further includes a third anchor member (73). The third anchor member (73) is fixed to the substrate (2), is located between the second anchor member (72) and the weight member (4), and is connected to the second anchor member (72) in plan view in the thickness direction (D1) defined with respect to the substrate (2).

In the angular velocity sensor (1; 1A; 1B) of the sixth aspect, the substrate (2) more stably supports the structural component (3), thereby improving performance.

In an angular velocity sensor (1; 1A; 1B) of a seventh aspect referring to any one of the first to sixth aspects, the first reference electrode (91) includes a plurality of first comb teeth (912). The second reference electrode (92) includes a base (921) and a plurality of second comb teeth (922) as the electrode portion of the second reference electrode (92), the plurality of second comb teeth (922) extending from the base (921). The plurality of first comb teeth (912) and the plurality of second comb teeth (922) are alternately aligned one by one and separated from each other in the prescribed direction. Part of the frame-shaped member (6) serves also as the base (921) of the second reference electrode (92).

The angular velocity sensor (1; 1A; 1B) of the seventh aspect is improved in sensitivity with its size being reduced.

In an angular velocity sensor (1; 1A; 1B) of an eighth aspect referring to any one of the first to seventh aspects, the structural component (3) further includes a second elastic member (52) in addition to a first elastic member (51) as the elastic member (5). The second elastic member (52) connects the frame-shaped member (6) to the anchor member (7) and is elastically deformable. The first elastic member (51) has at least one first folded part (513) in plan view in the thickness direction (D1) defined with respect to the substrate (2). The second elastic member (52) is elastically deformable in the prescribed direction and has at least one second folded part (523) in plan view in the thickness direction (D1) defined with respect to the substrate (2). The at least one first folded part (513) of the first elastic member (51) is equal in number to the at least one second folded part (523) of the second elastic member (52).

In the angular velocity sensor (1; 1A; 1B) of the eighth aspect, vibration of the weight member (4) is further stabilized, thereby improving performance.

In an angular velocity sensor (1A; 1B) of a ninth aspect referring to the second aspect, the structural component (3) includes a plurality of structural components (3). The angular velocity sensor (1A; 1B) of the ninth aspect further includes a third elastic member (53). The third elastic member (53) connects the frame-shaped members (6), which are closest to each other, of two structural components of the plurality of structural components (3) adjacent to each other in plan view in the thickness direction (D1) defined with respect to the substrate (2). The third elastic member (53) is elastically deformable in a direction in which the frame-shaped members (6) closest to each other are aligned with each other.

In the angular velocity sensor (1A; 1B) of the ninth aspect, vibrations of the weight members (4) of the two structural components (3) adjacent to each other are synchronized in an anti-phase, thereby improving performance.

An angular velocity sensor (1A; 1B) of a tenth aspect referring to the ninth aspect further includes a lever-arm member (10), a pair of fourth elastic members (54), and a pair of fifth elastic members (55). The lever-arm member (10) is elongated in plan view in the thickness direction (D1) defined with respect to the substrate (2). The lever-arm member (10) is aligned with the two structural components (3) adjacent to each other in plan view in the thickness direction (D1) defined with respect to the substrate (2). The pair of fourth elastic members (54) connect both ends in a longitudinal direction of the lever-arm member (10) to the frame-shaped members (6), which are closest to the lever-arm member (10), of the two structural components (3). The pair of fourth elastic members (54) are elastically deformable in the prescribed direction. The pair of fifth elastic members (55) connect a central part in the longitudinal direction of the lever-arm member (10) to the anchor members (7), which are closest to the central part of the lever-arm member (10), of the two structural components (3). The pair of fifth elastic members (55) are elastically deformable in a direction orthogonal to the thickness direction (D1) defined with respect to the substrate (2) and the prescribed direction.

In the angular velocity sensor (1A; 1B) of the tenth aspect, the weight members (4) of the two structural components (3) adjacent to each other are driven in the anti-phase and are synchronized with each other.

The configurations of the second to tenth aspects are not essential configurations of the angular velocity sensor (1; 1A; 1B) and are thus accordingly be omitted.

An angular velocity sensor (1; 1A; 1B) according to an eleventh aspect includes a substrate (2) and a structural component (3). The structural component (3) is provided at a side of a principal surface (21) of the substrate (2). The structural component (3) includes a weight member (4), a pair of frame-shaped members (6), a pair of first elastic members (51), a pair of anchor members (7), a pair of first input electrodes (81), a pair of second input electrodes (82), a pair of first reference electrodes (91), and a pair of second reference electrodes (92). The weight member (4) has an outer peripheral shape which is a polygonal shape in plan view in a thickness direction (D1) defined with respect to the substrate (2). The pair of frame-shaped members (6) are located on one side and the other side of the weight member (4) in a prescribed direction orthogonal to the thickness direction (D1) defined with respect to the substrate (2). The pair of frame-shaped members (6) are displaceable in the prescribed direction. Each of the pair of first elastic members (51) connects the weight member (4) to a corresponding one of the pair of frame-shaped members (6) and is elastically deformable in a direction orthogonal to the thickness direction (D1) defined with respect to the substrate (2) and the prescribed direction. Each of the pair of anchor members (7) supports the corresponding one of the pair of frame-shaped members (6) and is fixed to the substrate (2). The pair of first input electrodes (81) correspond to the pair of frame-shaped members (6) on a one-to-one basis. Each of the pair of first input electrodes (81) is located on an outer side of a corresponding one of the frame-shaped members (6), is separate from the corresponding one of the frame-shaped members and (6), and is fixed to the substrate (2). The pair of second input electrodes (82) includes electrode portions corresponding to the pair of frame-shaped members (6) on a one-to-one basis. Each of the electrode portions is located on the outer side of a corresponding one of the frame-shaped members (6) and is connected to the corresponding one of the frame-shaped members (6). Each of the pair of second input electrodes (82) faces a corresponding one of the first input electrodes (81) and is displaceable in the prescribed direction. The pair of first reference electrodes (91) correspond to the pair of frame-shaped members (6) on a one-to-one basis. Each of the pair of first reference electrodes (91) is located on an inner side of a corresponding one of the frame-shaped members (6) and is fixed to the substrate (2). The pair of second reference electrodes (92) includes electrode portions corresponding to the pair of frame-shaped members (6) on a one-to-one basis. Each of the electrode portions is located on the inner side of a corresponding one of the frame-shaped members (6) and is connected to the corresponding one of the frame-shaped members (6). The pair of second reference electrodes (92) face the pair of first reference electrodes (91) and are displaceable in the prescribed direction. In the structural component (3), each of the first input electrodes (81) and a corresponding one of the electrode portions of the second input electrodes (82) are located between the weight member (4) and the corresponding one of the pair of frame-shaped members (6) in the prescribed direction in plan view in the thickness direction (D1) defined with respect to the substrate (2).

REFERENCE SIGNS LIST 1, 1A, 1B Angular Velocity Sensor
2 Substrate
21 Principal Surface
3 Structural Component
4 Weight Member
5 Elastic Member
51 First Elastic Member
513 First Folded Part
52 Second Elastic Member
523 Second Folded Part
53 Third Elastic Member
54 Fourth Elastic member
55 Fifth Elastic Member
6 Frame-shaped Member
65 Projection
7 Anchor Member
71 First Anchor Member
72 Second Anchor Member
73 Third Anchor Member
75 Recess
8 Drive Portion
81 First Input Electrode
811 First Comb Base Part
812 First Comb Teeth
82 Second Input Electrode
821 Second Comb Base Part
822 Second Comb Teeth
9 Detecting Portion
91 First Reference Electrode
911 First Comb Base Part
912 First Comb Teeth
92 Second Reference Electrode
921 Base 922 Second Comb Teeth
10 Lever-Arm Member
D1 Thickness Direction

The invention claimed is:

1. An angular velocity sensor, comprising:
a substrate; and
a structural component provided at a side of a principal surface of the substrate,
the structural component including
a weight member,
a frame-shaped member aligned with the weight member in a prescribed direction orthogonal to a thickness direction defined with respect to the substrate and being displaceable in the prescribed direction,
an elastic member connecting the weight member to the frame-shaped member and being elastically deformable in a direction orthogonal to the thickness direction defined with respect to the substrate and the prescribed direction,
an anchor member supporting the frame-shaped member and being fixed to the substrate,
a first input electrode located on an outer side of the frame-shaped member to be separate from the frame-shaped member and being fixed to the substrate,
a second input electrode including an electrode portion located on the outer side of the frame-shaped member and being connected to the frame-shaped member, the second input electrode facing the first input electrode and being displaceable in the prescribed direction,
a first reference electrode located on an inner side of the frame-shaped member and fixed to the substrate, and
a second reference electrode including an electrode portion located on the inner side of the frame-shaped member and being connected to the frame-shaped member, the second reference electrode facing the first reference electrode and being displaceable in the prescribed direction,
in the structural component, the first input electrode and the electrode portion of the second input electrode being located between the frame-shaped member and the weight member in the prescribed direction in plan view in the thickness direction defined with respect to the substrate.

2. The angular velocity sensor of claim 1, wherein
the weight member has an outer peripheral shape which is a polygonal shape in plan view in the thickness direction defined with respect to the substrate,
the structural component includes a plurality of sets each including the elastic member, the frame-shaped member, the first input electrode, the second input electrode, the first reference electrode, and the second reference electrode, and
the plurality of sets are arranged such that the second input electrodes face sides of the polygonal shape on a one-to-one basis on an outer side of the weight member.

3. The angular velocity sensor of claim 2, wherein
the structural component includes a plurality of structural components, and
the angular velocity sensor further includes a third elastic member, the third elastic member connecting the frame-shaped members, which are closest to each other, of two structural components of the plurality of structural components adjacent to each other in plan view in the thickness direction defined with respect to the substrate, the third elastic member being elastically deformable in a direction in which the frame-shaped members closest to each other are aligned with each other.

4. The angular velocity sensor of claim 3, further comprising:
a lever-arm member which is elongated in plan view in the thickness direction defined with respect to the substrate and which is aligned with the two structural components adjacent to each other in plan view in the thickness direction defined with respect to the substrate;
a pair of fourth elastic members connecting both ends in a longitudinal direction of the lever-arm member to the frame-shaped members, which are closest to the lever-arm member, of the two structural components, the pair of fourth elastic members being elastically deformable in the prescribed direction, and
a pair of fifth elastic members connecting a central part in the longitudinal direction of the lever-arm member to the anchor members, which are closest to the central part of the lever-arm member, of the two structural components, the pair of fifth elastic members being elastically deformable in a direction orthogonal to the thickness direction defined with respect to the substrate and the prescribed direction.

5. The angular velocity sensor of claim 1, wherein
the elastic member is located on an outer side of the weight member.

6. The angular velocity sensor of claim 1, wherein
the structural component further includes a projection protruding from the frame-shaped member toward the anchor member,
the anchor member has a recess in which the projection is located, and
a gap is provided between the projection and the recess in plan view in the thickness direction defined with respect to the substrate.

7. The angular velocity sensor of claim 1, wherein
a first anchor member as the anchor member is adjacent to the frame-shaped member in a direction orthogonal to the prescribed direction in plan view in the thickness direction defined with respect to the substrate, and
the structural component further includes a second anchor member fixed to the substrate, the second anchor member being located between the first anchor member and the weight member and being connected to the first anchor member in plan view in the thickness direction defined with respect to the substrate.

8. The angular velocity sensor of claim 7, wherein
the structural component further includes a third anchor member fixed to the substrate, the third anchor member being located between the second anchor member and the weight member and being connected to the second anchor member in plan view in the thickness direction defined with respect to the substrate.

9. The angular velocity sensor of claim 1, wherein
the first reference electrode includes a plurality of first comb teeth,
the second reference electrode includes
a base and
a plurality of second comb teeth as the electrode portion of the second reference electrode, the plurality of second comb teeth extending from the base,
the plurality of first comb teeth and the plurality of second comb teeth are alternately aligned one by one and separated from each other in the prescribed direction, and part of the frame-shaped member serves also as the base of the second reference electrode.

10. The angular velocity sensor of claim 1, wherein
the structural component further includes a second elastic member in addition to a first elastic member as the elastic member, the second elastic member connecting the frame-shaped member to the anchor member and being elastically deformable,
the first elastic member has at least one first folded part in plan view in the thickness direction defined with respect to the substrate,
the second elastic member is elastically deformable in the prescribed direction and has at least one second folded part in plan view in the thickness direction defined with respect to the substrate, and
the at least one first folded part of the first elastic member is equal in number to the at least one second folded part of the second elastic member.

11. An angular velocity sensor, comprising:
a substrate; and
a structural component provided at a side of a principal surface of the substrate,
the structural component including
    a weight member having an outer peripheral shape which is a polygonal shape in plan view in a thickness direction defined with respect to the substrate,
    a pair of frame-shaped members located on one side and the other side of the weight member in a prescribed direction orthogonal to the thickness direction defined with respect to the substrate, the pair of frame-shaped members being displaceable in the prescribed direction,
    a pair of first elastic members each of which connects the weight member to a corresponding one of the pair of frame-shaped members and is elastically deformable in a direction orthogonal to the thickness direction defined with respect to the substrate and the prescribed direction,
    a pair of anchor members each of which supports the corresponding one of the pair of frame-shaped members and is fixed to the substrate,
    a pair of first input electrodes corresponding to the pair of frame-shaped members on a one-to-one basis, each of the pair of first input electrodes being located on an outer side of a corresponding one of the frame-shaped members and being fixed to the substrate,
    a pair of second input electrodes including electrode portions corresponding to the pair of frame-shaped members on a one-to-one basis, each of the electrode portions being located on the outer side of the corresponding one of the frame-shaped members and being connected to the corresponding one of the frame-shaped members, each of the pair of second input electrodes facing a corresponding one of the first input electrodes and being displaceable in the prescribed direction,
    a pair of first reference electrodes corresponding to the pair of frame-shaped members on a one-to-one basis, each of the pair of first reference electrodes being located on an inner side of a corresponding one of the frame-shaped members and being fixed to the substrate, and
    a pair of second reference electrodes including electrode portions corresponding to the pair of frame-shaped members on a one-to-one basis, each of the electrode portions being located on the inner side of the corresponding one of the frame-shaped members and being connected to the corresponding one of the frame-shaped members, the pair of second reference electrodes facing the pair of first reference electrodes and being displaceable in the prescribed direction,
in the structural component, each of the first input electrodes and a corresponding one of the electrode portions of the second input electrodes being located between the weight member and the corresponding one of the pair of frame-shaped members in the prescribed direction in plan view in the thickness direction defined with respect to the substrate.

* * * * *